(12) United States Patent
Wallgren et al.

(10) Patent No.: US 7,544,893 B2
(45) Date of Patent: Jun. 9, 2009

(54) EXTRUDED WIRE DUCT END CAP

(75) Inventors: Robert L. Wallgren, Bartlette, TN (US); Richard Laporte, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/880,996

(22) Filed: Jul. 25, 2007

(65) Prior Publication Data
US 2009/0025957 A1 Jan. 29, 2009

(51) Int. Cl.
*H02G 15/08* (2006.01)
(52) U.S. Cl. ......................... 174/93; 174/67
(58) Field of Classification Search ............ 174/93, 174/66, 67; 16/95 R
See application file for complete search history.

(56) References Cited

U.S. PATENT DOCUMENTS

| | | | |
|---|---|---|---|
| 1,992,574 A | 2/1935 | Jenkins | |
| 2,917,083 A | 12/1959 | Duvall et al. | |
| 3,786,171 A | 1/1974 | Shira | |
| 4,002,832 A * | 1/1977 | Debortoli et al. | 178/46 |
| 4,077,434 A | 3/1978 | Sieckert et al. | |
| 4,349,220 A | 9/1982 | Carroll et al. | |
| 5,206,972 A | 5/1993 | Nudelmont et al. | |
| 5,802,672 A | 9/1998 | Rohder | |
| 5,921,028 A | 7/1999 | Marocco | |
| 5,981,872 A | 11/1999 | Decore et al. | |
| 5,986,212 A | 11/1999 | Lhota | |
| 6,027,283 A | 2/2000 | Schweinberg et al. | |
| 6,199,321 B1 | 3/2001 | Ginzel | |
| 6,274,814 B1 | 8/2001 | Iavarone | |
| 6,384,329 B2 | 5/2002 | Buard | |
| 6,399,883 B1 | 6/2002 | Lhota | |
| 6,484,360 B1 | 11/2002 | DeBartolo, Jr. et al. | |
| 2005/0133016 A1 * | 6/2005 | Neal et al. | 126/19 R |

\* cited by examiner

*Primary Examiner*—Chau N Nguyen
(74) *Attorney, Agent, or Firm*—Hoffmann & Baron, LLP

(57) ABSTRACT

The present invention provides a wiring duct assembly including a duct base, a cover, and an end cap. The end cap is attached to the open end of the duct base with a friction fit to prevent any objects from accidentally entering the inside of the wiring duct. The cover attaches to the duct base forming an enclosure for holding the wiring therein. The end cap is designed to fit on the inside of the duct base so that the end cap does not interfere and add to the overall size of the wiring duct.

19 Claims, 2 Drawing Sheets

EXTRUDED WIRE DUCT END CAP

FIELD OF THE INVENTION

The present invention relates generally to an end cap for a wiring duct assembly which supports electrical and/or optical cables therein, and more particularly to an extruded wire duct end cap for a wiring duct systems or raceway systems.

BACKGROUND OF THE INVENTION

Wiring ducts are used to route and breakout wires inside of cabinets, such as power cabinet and control enclosures. The wiring duct can be mounted vertically or horizontally inside the cabinets. Although a top cover protects the wires inside the duct, the ends of the wiring duct remain open.

End caps are used to prevent components and/or tools from accidentally falling inside the wiring duct from the ends. The prior art end caps require multiple components including separate fasteners and a cap. Additionally, the caps are placed over the external surface of the duct and fastened in place.

A problem with prior art end cap is that there are many components and the difficulty of securing the end cap to the duct. There is also a tendency for the end cap to be damaged when it is necessary to access electrical wire and/or optical cables contained within the cable duct. A further problem in the prior art is that improper attachment of the end cap causes the end cap to disengage from the cable duct and become lost. Further, the end caps fit over the raceway and interfere with the overall size of the duct.

SUMMARY OF INVENTION

Applicants have overcome the shortcomings of prior art wiring duct end caps with the present invention. The present invention includes an end cap for enclosing an end of a wiring duct including a panel section and a pair of protrusions. The panel section has an interior surface and an exterior surface. The panel section is adapted to cover the end of the wiring duct. The pair of protrusions extend from the interior surface of the panel section, and angle away from each other. The pair of protrusions extend the length of the panel section, and they are adapted to extend within the end of the wiring duct The present invention includes an end cap for enclosing an end of a wiring duct including an extruded end cap including a panel section and a pair of protrusions. The panel section includes an interior surface, an exterior surface and a pair of length edges. The panel section is adapted to at least cover the end of the wiring duct. The pair of protrusions extend from the interior surface at an obtuse angle away from each other, and extend the length of the panel section. The pair of protrusions is inset from the pair of length edges.

DETAILED DESCRIPTION OF THE PREFERRED EMBODIMENTS

Figure 1:
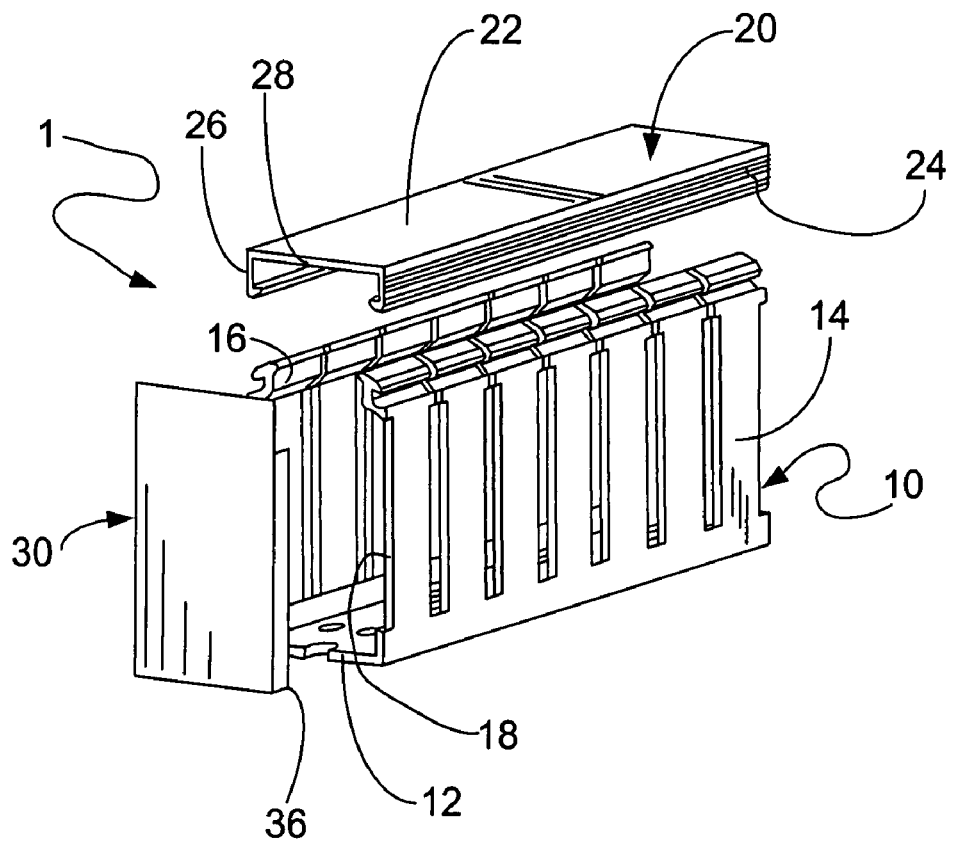
FIG. 1 is a perspective view of an alternative wiring duct end cap of the present invention being placed on a duct assembly.

Referring now to the drawing, there is shown in FIG. 1, a wiring duct assembly 1 including a duct base 10, a cover 20, and an end cap 30. The cover 20 attaches to the duct base 10 forming an enclosure for holding the wiring therein. End cap 30 is attached to the open end of the duct base 10 with a friction fit to prevent any objects from accidentally entering the inside of the wiring duct. The end cap 30 a unitary structure which does not include multiple part to attach it to the base. Further, the end cap 30 is designed to fit on the inside of the duct base 10 so that the end cap 30 does not interfere and add to the overall size of the wiring duct.

Figure 2:
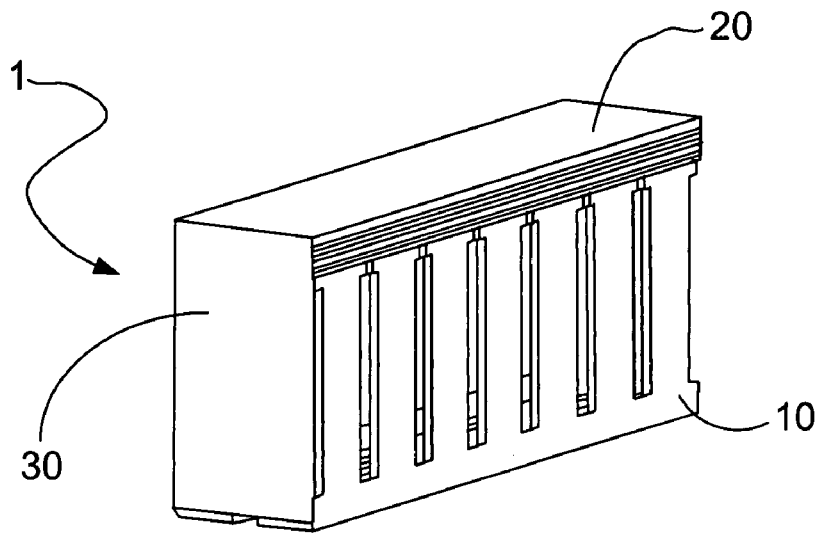
FIG. 2 is a perspective view of the alternative wiring duct end cap of FIG. 1 attached to the wiring duct assembly.

In FIGS. 1 and 2 the duct base 10 is shown generally in the form of a U-shaped channel with a bottom portion 12 and a pair of sidewalls 14 and 16 attached to the bottom portion 12. The duct base 10 may be made of any appropriate material such as sheet metal, substantially hard rubber, or preferably a plastic. Preferably, the duct base 10 is extruded in elongated sections several feet long. Multiple duct bases may be connected together or one end of the duct base may be a terminating end 18 of which an end cap 30 would be applied. While the duct base 10 of FIG. 1 is similar to the duct base in U.S. Pat. No. 6,803,519, it is contemplated that other designs of duct bases or raceways may benefit from the end cap 30 of the present invention due to the easy of manufacture and minimum amount of components.

The cover 20 has a top surface 22 attached to two opposing downwardly depending side walls 24, 26. The cover 20 has a latching mechanism which corresponds to the latching mechanism of the duct base 10. The cover 20 is aligned and attached to duct base 10 for containment of electrical wires and/or optical cables therein.

The end cap 30 includes a panel section 32 and a pair of protrusions or protruding wings 34, 36. The panel section 32 has an interior surface 31 and an exterior surface 33. The wings 34, 36 extend from the interior surface 31 of the panel section 32 and along parallel longitudinal axes. The wings 34, 36 are inset from the edges 41, 42 of the panel section 32 and generally extend uninterrupted along the length (L) of the panel section 32. The exterior surface 33 of the panel section 32 is a substantially flat planar surface. The panel section 32 is shaped similar to the perimeter of the duct end 18 and cover end 28. This panel section 32 is configured to provide a substantial end block at the end of the duct base 10 that encloses the contents therein. FIGS. 1-4 show the panel 32 encompassing the entire area of the duct end 18 and cover end 28; however, it is contemplated that the panel 32 may cover less than the entire area. Also it is contemplated that the panel 32 may be a solid planar material as shown in FIGS. 1-4, or the planar material may include holes, cuts outs but still providing enough material to retain the wires therein.

Figure 4:
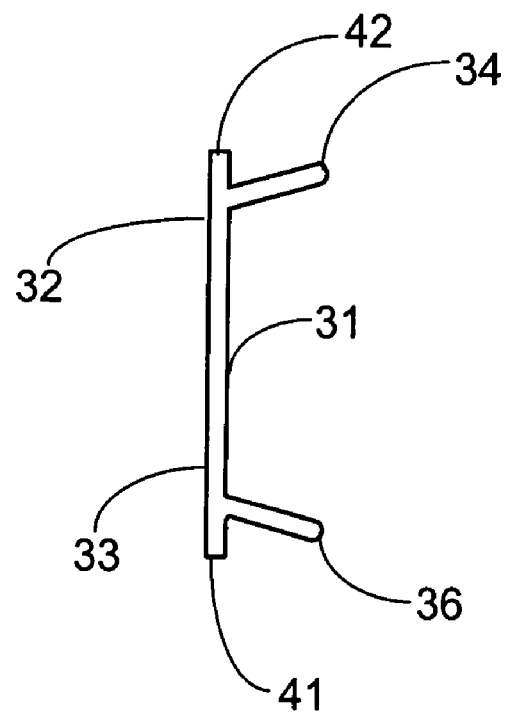
FIG. 4 is a top edge perspective view of the wiring duct end cap of FIG. 1.
Figure 3:
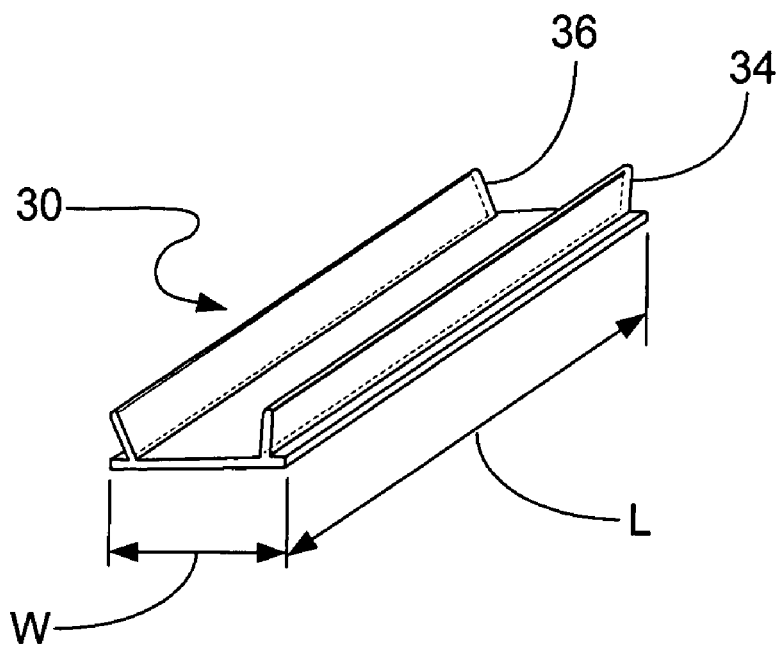
FIG. 3 is a perspective view of an extruded wiring duct end cap of the present invention.

FIGS. 3 and 4 show the pair of protruding wings 34, 36. The protruding wings 34, 36 are designed to provide a means of securing the end cap 30 to the base duct 10. FIG. 4 shows that the wings 34, 36 extend outwardly in opposing directions from each other forming an obtuse angle with respect to the panel portion 32, as shown in FIG. 4. The obtusely angled wings provide for frictional support and securement with the duct end 18 by the constant pressure on the wings 34, 36 from the sidewalls 14, 16.

The end cap 30 is extruded in elongated sections several feet long. The elongated sections are cut into the desired lengths to fit a variety of duct heights. The panel section is sized to encompass the cross-sectional area of the wiring duct or the wiring duct and cover to block the end of the wiring duct or the wiring duct and cover. The wings 34, 36 generally extend the length of the end cap 30. Depending on the duct 10 and cover 20 a portion of the wings may be cut off to custom fit the end cap 30 to the specific duct/cover assembly. FIGS. 1 and 2 show the top portion of the wings being cut off to accommodate the cover 20. The end cap may be made from a variety of extrudable material, i.e. plastics or rubbers.

The duct assembly 1 is formed by first cutting, if necessary, the wings 34, 36 of the end cap 30 to the desired length and removing the excess material. The modified end cap 30 is then aligned with the open end 18 of the duct 10. The cover 20 is aligned and secured to wiring duct 10. The cover 20 pulls the sidewalls 14, 16 of the duct 10 closer together. The interior sides of the wiring duct 10 are forced against the wings 34, 36 securing the end cap 30 against the sidewall 14, 16 with the constant pressure from the sidewalls 14, 16 against the wings 34, 36.

It should also be appreciated that the present invention may include various markings (not shown) which may be printed on the end cap 30 to provide product or other information to allow easy access to instructional assembly information and measurement markings and to reduce installation time and assist in accurate installation.

Another embodiment includes an emboss added to the wings of the end cap which lock into the wiring duct slots. A further embodiment includes a wing across the bottom of the end cap to provide securement of the end cap to the bottom of the duct base prior to installing the duct cover.

Having described the preferred embodiments herein, it should now be appreciated that variations may be made thereto without departing from the contemplated scope of the invention. Accordingly, the preferred embodiments described herein are deemed illustrative rather than limiting, the true scope of the invention being set forth in the claims appended hereto.

What is claimed is:

1. An end cap for enclosing an end of a wiring duct comprising:
   a panel section having an interior surface and an exterior surface, said panel section is substantially planar, said panel section is adapted to cover the end of the wiring duct, said panel is aligned flush with the end of the wiring duct, said panel is adapted to extend within said end of the wiring duct to prevent external interference and reduce size; and
   a single pair of protrusions extending from the interior surface of the panel section, said single pair of protrusions angled away from each other providing frictional attachment to said wiring duct, said single pair of protrusions extend along at least a portion of the length of the panel section, said pair of protrusions is adapted to extend within the end of the wiring duct.

2. The end cap of claim 1 wherein said panel section and said pair of protrusions is a unitary extruded body.

3. The end cap of claim 2 wherein said unitary extruded body is plastic.

4. The end cap of claim 2 wherein said unitary extruded body is rubber.

5. The end cap of claim 1 wherein said pair of protrusions are substantially parallel.

6. The end cap of claim 1 wherein said pair of protrusions is inset on said interior surface of said panel.

7. The end cap of claim 1 wherein said panel section is the same size as the wiring duct cross-section to block the end of the wiring duct.

8. The end cap of claim 1 wherein said panel section is sized to encompass the cross-sectional area of the wiring duct and a wiring duct cover to block the end of the wiring duct and the wiring duct cover.

9. The end cap of claim 1 wherein said panel section is a solid planar section.

10. The end cap of claim 1 wherein said panel section includes a means of securing said end cap to the wiring duct.

11. The end cap of claim 1 wherein said pair of protrusions extends from said panel section defining a width, said width provides frictional contact against the wiring duct interior walls.

12. The end cap of claim 11 wherein said protrusions extend uninterrupted along their length.

13. An end cap for enclosing an end of a wiring duct comprising:
    an extruded end cap comprising a panel section and a pair of protrusions, said panel section includes an interior surface, an exterior surface and a pair of length edges, said panel section is adapted to at least cover the end of the wiring duct, said panel section has a cross-sectional area the same size as the cross-sectional area of the wiring duct and a wiring duct cover to block the end of the wiring duct and the wiring duct cover, said pair of protrusions extend from the interior surface at an obtuse angle away from each other and frictionally engaged with the wiring duct, said pair of protrusions extend alone at least a portion of the length of the panel section, said pair of protrusions are substantially parallel and said pair of protrusions is inset from said pair of length edges.

14. The end cap of claim 13 wherein said panel section is a solid planar section.

15. The end cap of claim 13 wherein said panel section includes a means of securing the end cap to the wiring duct.

16. The end cap of claim 13 wherein said pair of protrusions extends from the panel section defining a width, said width provides a frictional contact against the wiring duct interior walls.

17. The end cap of claim 13 wherein said end cap is plastic.

18. The end cap of claim 13 wherein said end cap is rubber.

19. The end cap of claim 13 wherein said protrusions extend uninterrupted along their length.

* * * * *

UNITED STATES PATENT AND TRADEMARK OFFICE
CERTIFICATE OF CORRECTION

PATENT NO.         : 7,544,893 B2                              Page 1 of 1
APPLICATION NO. : 11/880996
DATED              : June 9, 2009
INVENTOR(S)        : Wallgren et al.

It is certified that error appears in the above-identified patent and that said Letters Patent is hereby corrected as shown below:

At column 2, line 30, the printed patent reads "...due to the easy of manufacture..."; the patent should read instead as "...due to the ease of manufacture...";

At column 4, claim 13, line 39, the printed patent reads "...extend alone at least a..."; the patent should read instead as "...extend along at least a...".

Signed and Sealed this

Eighteenth Day of August, 2009

David J. Kappos
*Director of the United States Patent and Trademark Office*